Figure 1:
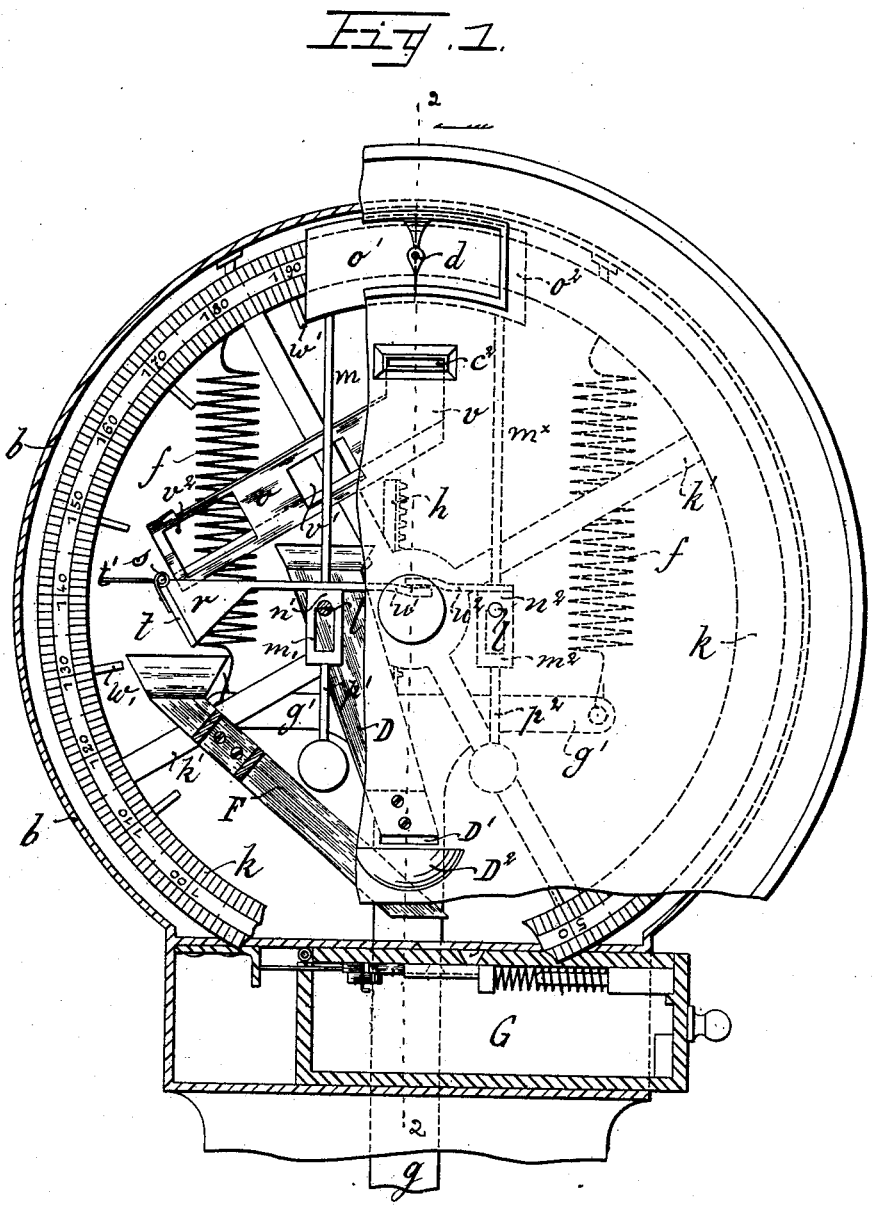

(No Model.)  3 Sheets—Sheet 1.

G. REIMANN.
COIN RELEASED WEIGHING MACHINE.

No. 376,910. Patented Jan. 24, 1888.

Witnesses:
E. B. Bolton
J. R. Wapenger

Inventor.
George Reimann
By Henry Connett
Atty.

(No Model.) 3 Sheets—Sheet 2.

G. REIMANN.
COIN RELEASED WEIGHING MACHINE.

No. 376,910. Patented Jan. 24, 1888.

Witnesses:
E. B. Bolton

Inventor:
George Reimann
By Henry Connett
Atty.

(No Model.) 3 Sheets—Sheet 3.

G. REIMANN.
COIN RELEASED WEIGHING MACHINE.

No. 376,910. Patented Jan. 24, 1888.

WITNESSES:
E. B. Bolton
J. O. Caplinger

INVENTOR:
George Reimann
By Henry Connett
Atty.

UNITED STATES PATENT OFFICE.

GEORGE REIMANN, OF BERLIN, GERMANY, ASSIGNOR TO THE NAEHMASCHINEN-FABRIK, VORMALS FRISTER & ROSSMANN, ACTIEN-GESELLSCHAFT, OF SAME PLACE.

COIN-RELEASED WEIGHING-MACHINE.

SPECIFICATION forming part of Letters Patent No. 376,910, dated January 24, 1888.

Application filed January 26, 1887. Serial No. 225,583. (No model.) Patented in Germany July 28, 1886, No. 40,394; in Austria-Hungary August 7, 1886, No. 37,318 and No. 44,428; in Belgium August 10, 1886, No. 74,173; in France August 11, 1886, No. 177,905, and in England August 13, 1886, No. 10,383.

*To all whom it may concern:*

Be it known that I, GEORGE REIMANN, of the city of Berlin, in the Kingdom of Prussia and German Empire, have invented certain new and useful Improvements in Weighing-Machines, (for which patents have been granted in the following countries, namely: in Germany July 28, 1886, No. 40,394; in Austria-Hungary August 7, 1886, No. 37,318, and No. 44,428; in France August 11, 1886, No. 177,905; in Belgium August 10, 1886, No. 74,173, and in England August 13, 1886, No. 10,383,) of which the following is a specification.

My invention relates to automatic weighing-machines wherein the pointer or indicator remains stationary, while the dial on which are marked the weight-graduations is rotatively mounted and rotates within a casing, and is only visible at an opening in the casing at the position occupied by the index or pointer. This opening in the casing is closed normally by slides or flaps, which are moved aside by an inserted coin, as will be hereinafter described, and when so displaced the fixed pointer will indicate on the dial thus disclosed the weight of the person or object on the platform of the machine. This arrangement of the moving dial and fixed pointer allows the weight to be read off on the dial more easily than it can in such weighing-machines as have moving hands or pointers, and the parts of the machine are so protected by this construction that they are not liable to be injured.

It very frequently occurs with this class of weighing-machines, despite the directions that usually accompany them, that coins other than the particular kind adapted to operate the machine are inserted in the coin slit or opening, and the party who has thus inadvertently or mistakenly inserted such a coin wishes to reclaim it. In order to enable the owner to recover an improper coin so inserted, I provide my machine with a novel mechanism whereby any coin that is too small to properly actuate the machine will be switched off from the normal route of the coin through the machine and will pass out of the casing at the lower part thereof and fall into a suitable outside receptacle, where the owner may recover it.

My invention will be hereinafter fully described, and its novel features carefully defined in the claims.

Figure 2:
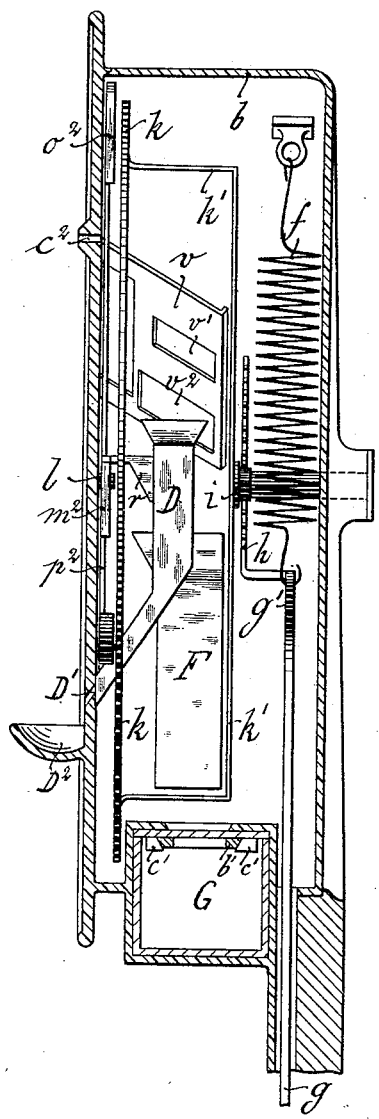
Figure 3:
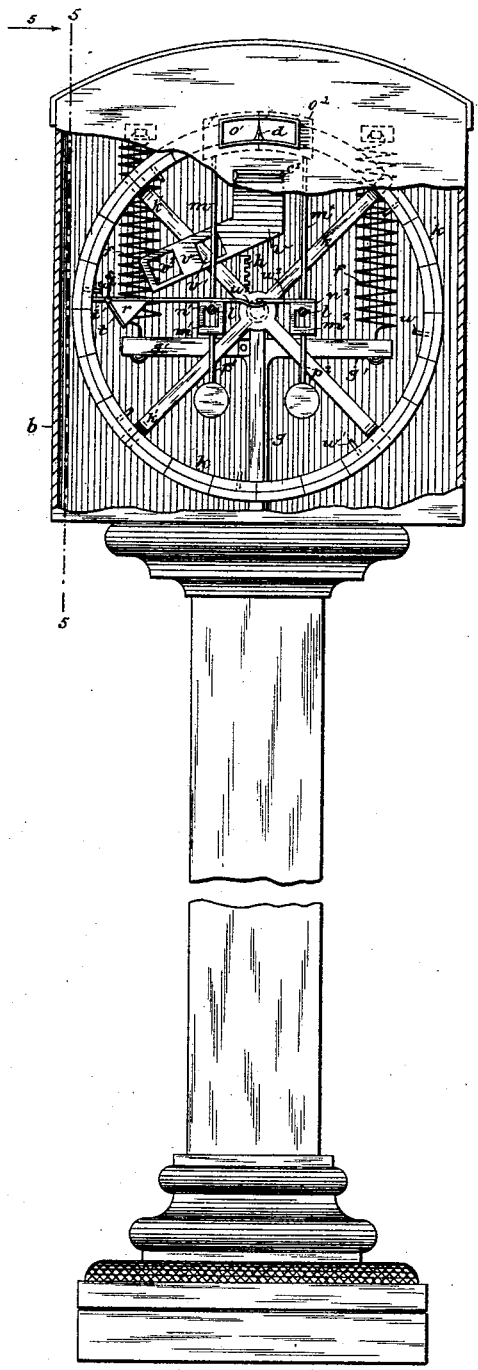
Figure 4:
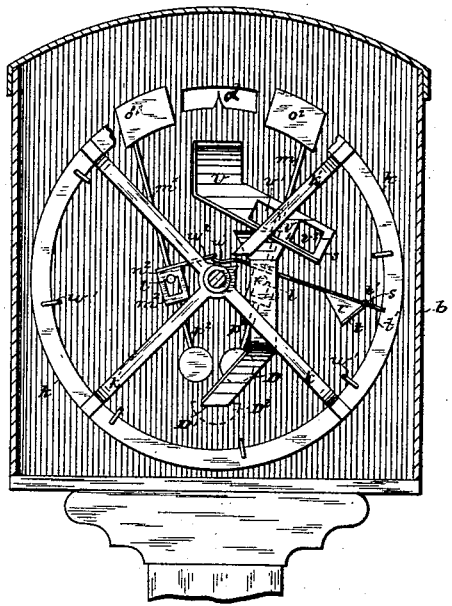
Figure 5:
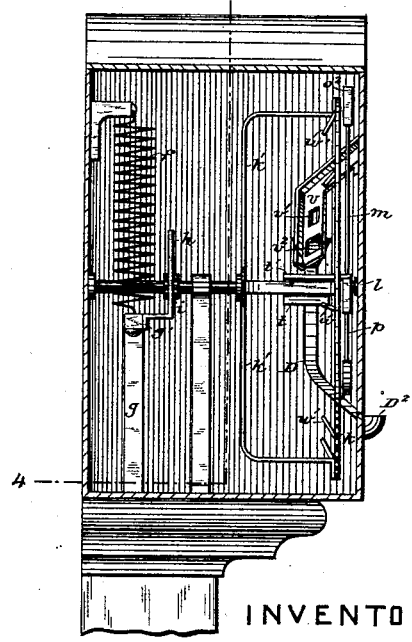

In the drawings which serve to illustrate my invention, Figure 1 is a front elevation as to the right-hand side, and a sectional elevation as to the left-hand side, of the upper part of an automatic weighing-machine embodying my improvements—that is to say, the casing of the machine is broken away or removed at the left-hand side, so as to expose the internal mechanism. In this view the cash box or drawer at the lower part is in section. Fig. 2 is a vertical section of the casing of the machine, substantially on line 2 2 in Fig. 1, showing the internal mechanism in edge elevation, as seen from the right in Fig. 1. Fig. 3 is a front view, on a smaller scale, showing also the base of the machine. In this view the face-plate is broken away or removed from the lower part of the casing. Fig. 4 is a vertical section on the line 4 4, Fig. 5, showing part of the internal mechanism, as seen from the rear. This view represents the skeleton dial partly broken away in order to show the slides, these latter being represented as displaced in this view. Fig. 5 is a section on line 5 5 in Fig. 3. Figs. 3, 4, and 5 are on the same scale.

The platform of my improved weighing-machine is of the usual construction, and the lever mechanism of the same acts upon the register or indicator through the medium of a connecting-rod, *g*, the cross-beam *g'* on the head of said rod being connected with the helical weighing spring or springs *f*. There may be one or more of these springs. A toothed rack or rack-bar, *h*, carried by the beam *g'*, meshes with a pinion, *i*, fixed on the spindle of the rotating graduated dial *k*. In this case the dial *k* is a ring-like or skeleton dial, secured to cranked arms *k'*, radiating from a hub on the dial-spindle. If a weight be placed on the platform, this will draw down the rod *g* and the beam *g'*, distending the springs *f* in proportion to the weight. The rack *h*, acting through the pinion $i$, will rotate the dial $k$, and thus bring the proper graduation-mark opposite to an index or pointer, $d$, fixed to casing $b$, which houses the mechanism; but the figures indicating the weight of the object will not be visible until a coin or its equivalent of a certain size and weight shall be inserted into the coin-slit $c^2$ in the casing, which will displace a slide or slides, $o' o^2$, which normally close an aperture in the casing $b$ at the point where the index $d$ is placed, thus disclosing a part of the dial $k$ at this point.

I will now describe the mechanism whereby the coin is made to move or displace said slides $o' o^2$. These slides are fixed, respectively, on the upper ends of rods $m m^x$, which have at their lower ends frames $m' m^2$, mounted, respectively, on knife-bearings $n' n^2$. The frames $m' m^2$ carry, respectively, suspended weighted rods $p' p^2$, whereby the rods $m m^x$ are caused to stand vertical normally and hold the slides $o' o^2$ closed. On an arm which projects laterally from the frame $m'$ is carried a hopper-like receptacle, $r$, one inclined side, $t$, of said receptacle being hinged on a pin, $s$, at its upper edge and provided with a weighted arm, $t'$, which keeps said side $t$ closed normally. The frame $m'$ is also provided at its other side with a laterally-projecting arm, $u'$, which takes under a like arm, $u^2$, projecting from the frame $m^2$. An inclined chute, $v$, leads from the coin-slit $c^2$ down to the hopper-like receptacle $r$.

So far as described, the operation is as follows: When a person steps onto the platform of the machine, the dial $k$ revolves until the proper figure or graduation comes opposite to the pointer $d$. He then inserts a coin of the proper kind into the coin-slit $c^2$, and this coin slides down the coin-chute $v$ and falls into the receptacle $r$. Its weight depresses said receptacle, rocks the frame $m'$ on its bearing $n'$, and thus moves or displaces the slide $o'$ to the left; but the arm $u'$ on the frame $m'$, taking under the arm $u^2$, rocks the frame $m^2$ simultaneously, and thus moves the slide $o^2$ to the right. Slides $o'$ and $o^2$ by their movements disclose the dial, and thus show the person on the platform what his weight is. When he steps off the platform, the springs $f$ will rotate the dial back again, and in doing this one of several inwardly-projecting pins, $w'$, on the dial will catch under the arm $t'$, lift it, open the side $t$, and permit the coin in the receptacle $r$ to fall into the chute F, whence it may pass into any locked receptacle below. The weighted rods $p' p^2$ will by gravity return the slides $o' o^2$ to their normal positions again, as will be readily understood. The machine is now set or ready for the next weighing operation.

If a coin that is too small should be inserted at the coin-slit $c^2$, it will not pass to the receptacle $r$. In the inclined side of the chute $v$ are two orifices, a small orifice, $v'$, nearest the slit $c^2$, and a larger orifice, $v^2$, near the lower end of same and over the receptacle $r$. The orifice $v'$ will not permit a coin of the proper size to pass through it, but the orifice $v^2$ will. Now, if a coin that is too small be inserted, it will glide down chute $v$ until it reaches the smaller orifice, $v'$, and will pass through this orifice and drop into a chute, D, whence it will be led out through an orifice, D', in the casing. Below this orifice or slit is placed a suitable dish or receptacle, $D^2$, into which the coin falls and may be recovered by its owner. If the coin be of the proper kind, it will pass the orifice $v'$ and finally pass out through the orifice $v^2$ into the receptacle $r$. As I have said, the coins from the receptacle $r$ pass down the chute F, and eventually fall into a cash box or drawer, G, connected with the machine. This cash-box, however, forms no part of my present invention, and its novel features are embodied in another pending application of mine, which is a division of the present application, and was filed May 24, 1887, and which bears the Serial No. 239,199.

So far as my present invention is concerned any form of cash-receptable may be employed.

The object in employing two simultaneously-moving slides, $o' o^2$, is to lessen the extent of movement of the slide in disclosing the dial.

It will be understood without further explanation that all the parts must be properly constructed and balanced with respect to a coin of a certain weight and size, as in all machines of this class.

I am aware that, broadly speaking, it is not new to utilize an inserted coin as a weight to depress a slide, and thus open an aperture in a casing; and I am also aware that it is not new, broadly, to provide the flat bottom of a chute of a fare-box with an aperture through which coins that are too small will fall. Therefore I do not broadly claim these features. My construction has special novel features.

Having thus described my invention, I claim—

1. A case provided with a sight-opening and with a coin-receiving slit, combined with an interior counterbalanced slide which in its normal state covers said sight-opening and is interposed between said sight-opening and a rotating dial within said case, the said rotating dial provided with projecting pins, as $w'$, and a coin-receptacle, as $r$, carried by an arm connected with said slide and furnished with a hinged side, as $t$, having an arm, as $t'$, which holds said side normally closed, said arm $t'$ being arranged to stand, when the receptacle $r$ is depressed and contains a coin, in the path of the pins on the dial, whereby the backward rotation of the dial serves to discharge said coin, substantially as set forth.

2. In an automatic weighing-machine, the combination, with the casing $b$, having a fixed pointer, $d$, an opening at said pointer whereat the dial is visible, and a coin-slit, $c^2$, of the dial $k$, rotatively mounted within said casing and provided with pins $w'$, flaps or slides $o' o^2$, covering said opening in the casing normally, the rods $m m^x$, carrying said slides, their frames $m' m^2$, bearings $n' n^2$, weighted rods $p' p^2$, receptacle $r$, provided with a hinged side, $t$, having a weighted arm, $t'$, said frames $m'\,m^2$ being provided, respectively, with overlapping arms $u'\,u^2$, and the chute $v$, all arranged substantially as set forth.

3. In an automatic weighing-machine, the combination, with the revolving dial provided with pins $w'$ and the inclosing-casing $b$, having an opening through which a part of the dial is visible, a fixed pointer, $d$, at said opening, and a coin-slit, $c^2$, of the slide $o'$, mounted on a rocking bearing, $n'$, and provided with a suspended weight to maintain it in its normal position, the receptacle $r$, fixed to an arm projecting laterally from the rod carrying said slide $o'$, said receptacle having a hinged side, $t$, provided with a weighted arm, $t'$, to keep it normally closed, and the chute $v$, leading from the coin-slit $c^2$ to receptacle $r$, said weighted arm $t'$ being arranged in the path of the pins $w'$ on the dial.

4. In an automatic weighing-machine, the combination, with the inclosing-casing having a fixed pointer, $d$, a dial-disclosing opening at said pointer, and a coin-slit, $c^2$, of a revolving dial within said casing and visible through said opening, the lever $t\,t'$, a coin-hopper, and two movable slides, $o'\,o^2$, made to recede from each other when a coin inserted in the machine causes the lever $t\,t'$ to move, substantially as described in the foregoing specification and shown in the accompanying drawings.

In witness whereof I have hereunto signed my name in the presence of two subscribing witnesses.

GEORGE REIMANN.

Witnesses:
  B. ROI,
  ANTHONY STEFFEN.